March 28, 1961 J. P. HAAS ET AL 2,976,953
FILTER
Filed May 16, 1958 4 Sheets-Sheet 1

INVENTORS
JAMES P. HAAS, and
GORDON L. MORGRET.
BY
Oscar B. Brumback
their
ATTORNEY March 28, 1961    J. P. HAAS ET AL    2,976,953
FILTER
Filed May 16, 1958    4 Sheets-Sheet 2

INVENTORS
JAMES P. HAAS, and
GORDON L. MORGRET.
BY Oscar B. Brumback
their
ATTORNEY March 28, 1961   J. P. HAAS ET AL   2,976,953
FILTER
Filed May 16, 1958   4 Sheets-Sheet 3
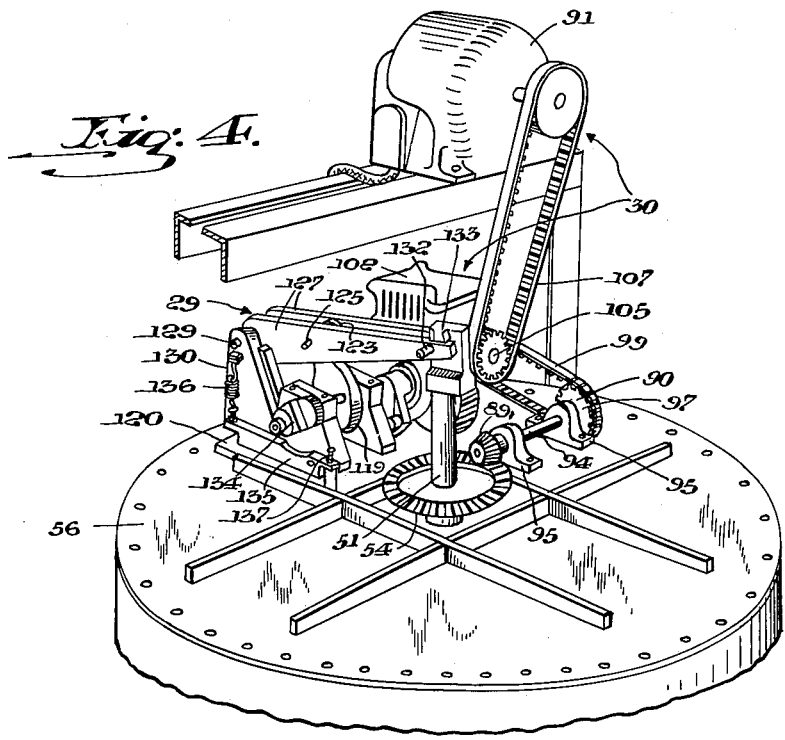
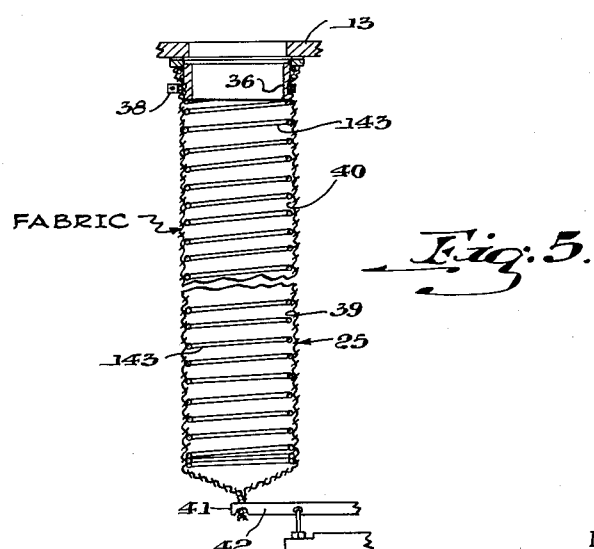
INVENTORS.
JAMES P. HAAS, and
GORDON L. MORGRET.
BY
Oscar B. Brumback
their
ATTORNEY.

March 28, 1961  J. P. HAAS ET AL  2,976,953
FILTER

Filed May 16, 1958  4 Sheets-Sheet 4

INVENTORS.
JAMES P. HAAS, and
GORDON L. MORGRET.
BY
Oscar B. Brumback
their
ATTORNEY.

United States Patent Office 2,976,953
Patented Mar. 28, 1961

2,976,953

FILTER

James P. Haas and Gordon L. Morgret, Baltimore, Md., assignors to Koppers Company, Inc., a corporation of Delaware Filed May 16, 1958, Ser. No. 735,741

5 Claims. (Cl. 183—61)

This invention relates to an apparatus for removing particles from gases in which they are entrained and more particularly to such an apparatus commonly designated as a dust filter.

Ordinarily dust filters have been used heretofore wherein filter media has been used which was formed into elongated filter elements or filter bags, from which the name "bag filters" is derived. These filter bags were formed so as to be open at one end and otherwise closed thereby to provide upstream and downstream portions, and these filter bags have been arranged by suitable attachments in a bag filter housing so that particle-laden gas passed through the filter bags thereby depositing solid material thereon and clean gas passed from the downstream portions out the open ends thereof from whence the clean gas was removed from the filter.

The filter media was conventionally porous material such as matted glass, asbestos fibers, wool felt, synthetic felt as well as other similar materials. When particle-laden gas was passed through bags which used such filter media the patricles were deposited on the upstream sides or portions of the filter media and in time this clogged the pores with a consequent reduction in gas flow capacity. As a result of this clogging and since this clogging progressed rapidly it was either necessary to recondition from time to time the filter media so that gas could pass through the filter media at a desired rate, or it was necessary entirely to replace the filter media after clogging had progressed to a point where the rate of gas flow became too low. Since it was costly and highly inefficient to replace the filter media when porosity became so low as to be objectionable, provisions were usually made for reconditioning or cleaning the filter media by removing the particles deposited thereon.

Heretofore reconditioning of the filter media has been accomplished by causing a reverse flow of gas through the filter bags while the filter was in operation and thus the particles which accumulated on the upstream portions of the filter bags and reduced the flow capacity thereof were removed so as to reestablish the desired flow rates.

Bag filters seem advantageously suited for applications where large volumes of dirty gas must be filtered by a filter which takes up a small amount of space because many filtering bags may be suspended in a small bag filter housing. A problem existed heretofore, however, in providing a bag filter with enough filter bags for desired high flow rates together with means for creating sufficient reverse flow of gas to accomplish the desired reconditioning. For example, an integral piston which was reciprocated in the filter has been used heretofore for providing the reverse flow required but such pistons have not had the ability to cause reverse flows of air of sufficient volume and force to clean adequately a plurality of filter bags with large filtering areas, and the shocks which the piston imparted to the filter were destructive to the filter equipment.

In accordance with this invention, a dust filtering unit is provided having a plurality of elongated filter bags or filter elements with openings at one end and with upstream and downstream sides or portions and said filter bags are attached in a housing so that the downstream sides are selectively communicable with a reverse flow means wherein a reciprocating piston momentarily reversing the flow of gas through one or more of the filter bags is provided with a novel mechanism for raising and forcefully lowering said piston suddenly to cause said momentary reversal of gas flow, a novel buffer means for absorbing shock caused by this lowering of the piston, a novel flow distributor for the dirty gas, and a novel means for supporting the bags on their downstream portions which permits flexing of the bags when said reverse flow means causes said reverse gas flow.

The above and further novel features of the invention will appear more fully from the following detailed description when the same is read in connection with the accompanying drawings. It is to be expressly understood, however, that the drawings are not intended as a definition of the invention but are for the purpose of illustration only.

Fig. 4 is an isometric view of Fig. 3 showing the cam of the lifting mechanism.

Fig. 5 is another embodiment of the filter bags of Fig. 1.

Figure 1:
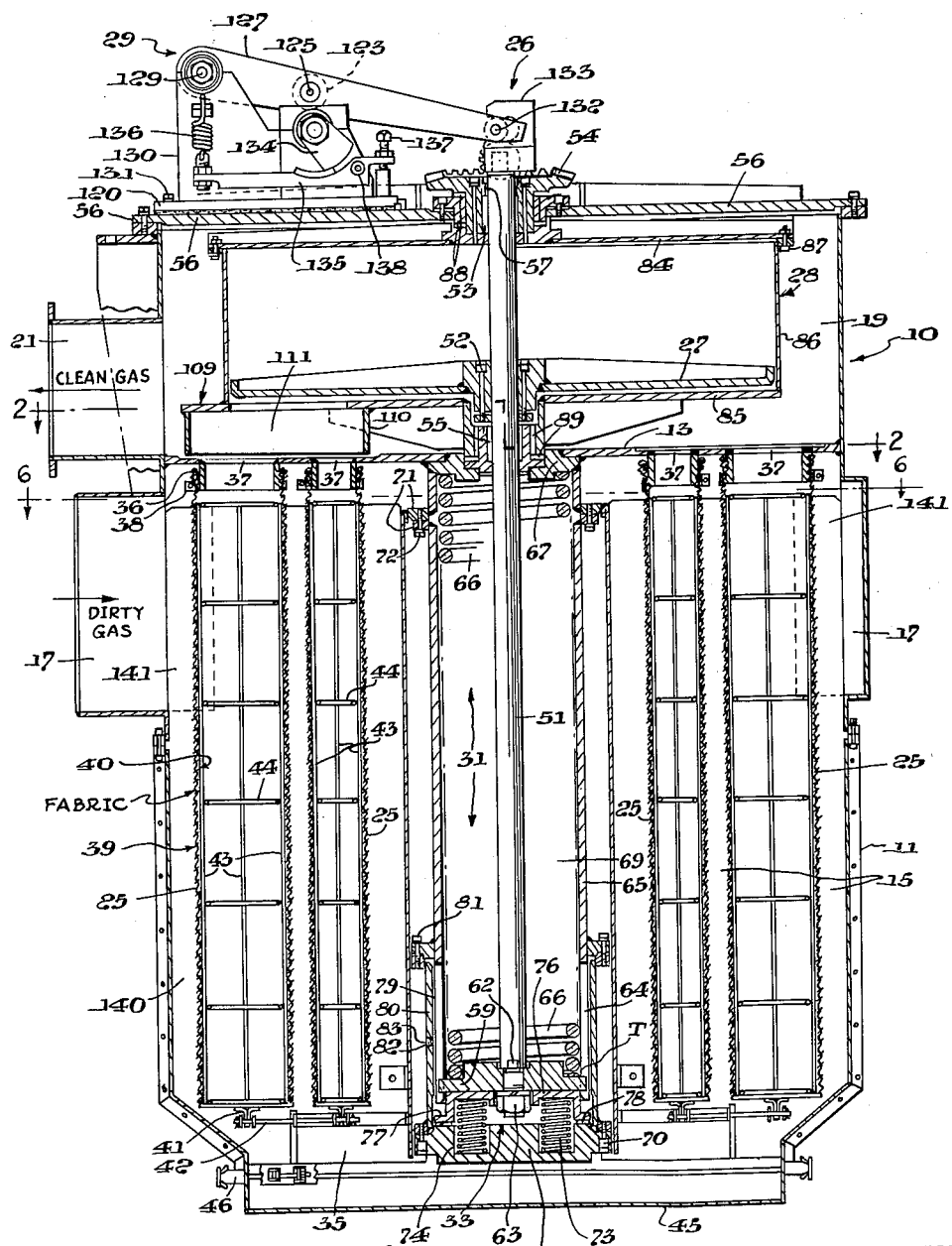
Fig. 1 is an elevation and partial cross-sectional view of a bag filter apparatus employing the invention.

Referring to Figure 1, a gas cleaner is shown which is adapted for cleaning the air in the immediate vicinity of dirty industrial apparatus. For example, while not limited thereto, it may be used for cleaning the dirty air in and around grinding mills whereby dirty air passes into the filter 10 and leaves as clean air. To accomplish this cleaning, filter 10 has a substantially cylindrical housing 11 which is divided by an apertured plate 13 into a cleaning chamber 15 having an inlet duct 17 for the introduction of particle-laden gas under pressure and an outlet chamber 19 having an outlet duct 21 for the removal of clean gas. In the cleaning chamber 15 are a plurality of filter bags 25, sometimes called filter elements, having large filtering areas, which bags are reconditioned by a reverse flow mechanism 26 integrally attached to the housing 11. The reverse flow mechanism includes a reciprocable piston 27, sometimes called a plunger, which is substantially enclosed in a rotatable cylinder 28 positioned in the outlet chamber 19, and the piston 27 is lifted in the cylinder 28 by a lifting mechanism 29 (Fig. 3) attached to the top of the housing 11. Operable with the lifting mechanism 29 are: a drive mechanism 30 which also rotates cylinder 28 in chamber 15, an actuating mechanism 31 to lower suddenly the piston 27, and a buffer mechanism 33 to cushion the shock from the sudden downward movement of the piston. Also provided are baffle arrangements in inlet 17 and cleaning chamber 15 to improve the efficiency of the filter elements 25.

Referring to Fig. 1 cleaning chamber 15 of housing 11 is defined by a hopper or bin 35 at its lower end and apertured plate 13 at its upper end, the latter being fixed to the inside of housing 11 in a fluid tight manner such as by welding. Disposed in two annular rows in chamber 15 are a plurality of filter bags 25 and conveniently the bags in the outside row may be larger in diameter than the bags in the inside row. These bags may be made of base weave or non-base weave felts made with matted glass, asbestos fibers, wool felt, synthetic felt or other filter material known in the art and the bags are in the form of elongated tubes open only at one end. These open ends are attached to the extensions 36 of two annular rows of apertures 37 in plate 13 by suitable clamps 38 so that the filter bags 25 each have an upstream side or portion 39 exposed to the prevailing pressure of the dirty gas introduced into chamber 15 from inlet 17 and a downstream side or portion 40 communicating with chamber 19 through the open ends of the filter bags 25. Small and large bottom closed portions of the filter bags 25 corresponding to the respective bag diameters are provided with eyes 41 for the attachment to the bottom of housing 11 by rods 42. The bags 25 are supported on the inside or downstream portions by rods 43 extending along the inside diameter of the bags parallel to their longitudinal axis and these rods 43 are supported therein by circular hoops 44 to which they are attached by suitable means such as by welding.

Thus the gas entering chamber 15 from inlet 17 passes through the filter bags 25 depositing the particles entrained in the gas on the upstream sides 39 thereof and clean gas passes from the downstream sides 40 of the filter bags 25 through the apertures 37 of plate 13 to chamber 19 from whence the clean gas is removed through outlet 21. A removable cover 45 is held over the lower end of housing 11 by clamp 46 in a fluid tight manner and this cover 45 is easily removable by the loosening of clamp 46 for the removal of dust which accumulates in the bin 35 due to the reverse flow mechanism to be described hereinafter.

The actuating mechanism 31 is also advantageously located in chamber 15. This actuating mechanism 31 includes a shaft 51 which is attached to the piston 27 by suitable means such as by bolts 52, and shaft 51 is reciprocatable in bearing 53 mounted in bevel gear 54, bearing 55 mounted in collar 67 and seal 57 mounted in bevel gear 54. The bottom of shaft 51 is attached to a collar 59 by suitable means such as bolt 62 and nut 63 and the shaft 51 reciprocates so that collar 59 rides in slots 64 provided in the side of a tube or tubular housing 65 which surrounds a coil spring 66. Coil spring 66 surrounds the shaft 51 and extends from collar 59 to a second collar 67 which is attached to the bottom of apertured plate 13 and the top of tubular housing 65 such as by welding. The tube 65 is closed at its bottom by a plate 68 attached thereto by bolts 70 so as to provide a substantially closed chamber 69 surrounding the spring 66 and this tube is made in two sections which are attached by suitable lugs 71 and bolts 72. Thus when the piston 27 is raised in cylinder 28 by the lifting mechanism 29, shaft 51 and collar 59 in their upward movement compress and load spring 66 between collars 59 and 67. This compression is used to force the piston 27 downward, advantageously with a force of 300 pounds total force.

The actuating mechanism 31 is in operable association with a buffer mechanism 33 disposed in chamber 15 at the lower end of tube 65. This buffer mechanism cushions the shock caused by the sudden downward movement of the piston shaft 51, and comprises four springs 73 located in recess 74 in plate 68 so that the springs resist the downward movement of collar 59 attached to the shaft 51 near the bottom of the stroke of the collar 59. Located on the top of springs 73 is a ring 76 which fits over the springs 73. When collar 59 is raised the ring 76 is raised by springs 73 until its shoulder 77 hits the bottom of tube 65 and thus the collar 59 disengages ring 76. When collar 59 is lowered collar 59 hits ring 76 thereupon causing shoulder 77 to hit a resilient neoprene gasket 78 which is placed between ring 76 and plate 68. Also part of the buffer mechanism 33 is an orifice 79 provided by a cylindrical tube 80 which is attached to the tube 65 by bolts 81 and this orifice 79 is communicable with the chamber 69 inside of tube 65. The chamber 69 inside tube 65 is filled with oil approximately to point T in chamber 69 but this may be varied to any suitable level. Thus when the shaft 51 and collar 59 are forced downward by spring 66 the oil in chamber 69 at the bottom of tube 65 is forced through the orifice 79 by collar 59 thereby cushioning the shock of the downward movement of the shaft 51 and the piston 27. A hole 83 is provided in the side of the tube 80 for filling oil into the chamber 69 and this hole is plugged thereafter by plug 82 to prevent leakage therefrom. Some of the oil forced into orifice 79 may begin to seep back into chamber 69 after collar 59 reaches the bottom of its stroke and before the collar 59 is raised in the manner of any liquid which tries to find its own level. When the shaft 51 and collar 59, however, are raised all the oil forced through orifice 79 empties back into the chamber 69.

Figures 2, 3:
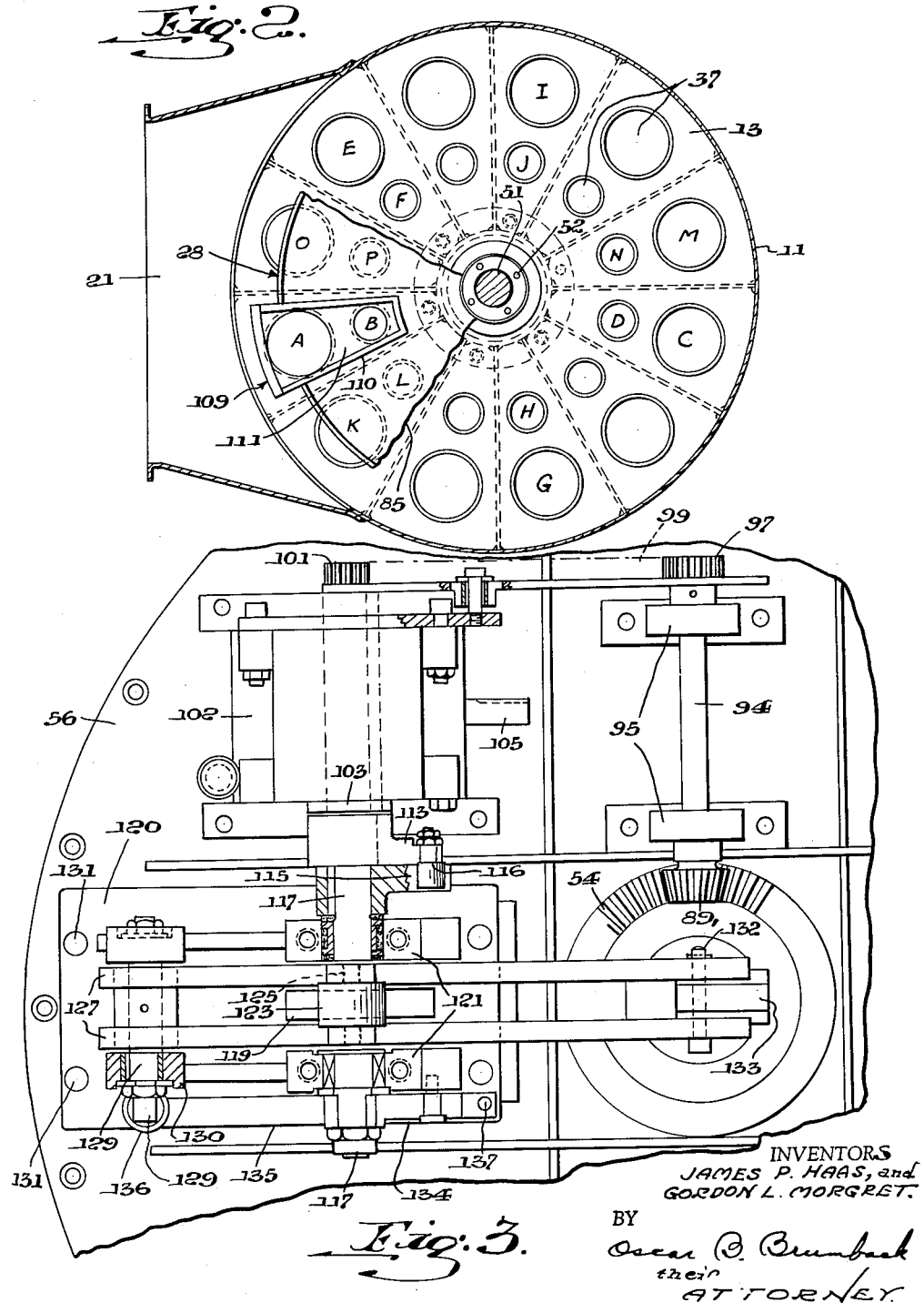
Fig. 2 is a sectional view of the apertured plate and outlet duct through the line 2—2 of Fig. 1.
Fig. 3 is a plan view of the drive mechanism for the reverse flow mechanism.

The upper chamber 19 of housing 11 is defined at the bottom by apertured plate 13 and at the top by plate 56. Chamber 19 encompasses cylinder 28 containing the reciprocatable piston 27. Cylinder 28 is substantially closed at the top by plate 84 and at the bottom by plate 85 which plates are connected to side 86 by suitable means such as by welding and by bolts 87 so as to substantially close cylinder 28. The cylinder 28 is rotatable in chamber 19 by means of beveled gear 54 attached to the top of cylinder 28 and rotatable in a suitable bearing 88 in plate 56 and bearing 89 in collar 67. This gear 54 is in engagement with gear $89_1$ which in turn is driven by a suitable power source such as motor 91 (Figs. 3 and 4). The gear $89_1$ is supported on one end of a shaft 94 rotatable in bearings 95 whose other end is provided with a gear 97 which is connected by a suitable chain 99 to an output shaft 101 of a conventional gear reducing drive 102. Drive 102 has two output shafts 101 and 103. These two output shafts may be driven at different speeds at an input shaft 105 which is driven from motor 91 (Fig. 4) through a sutable belt 107. These shafts 101, 102, and 103 may rotate at different speeds which are determined by the gears of drive 102 and advantageously shafts 101 and 103 rotate slowly. Thus rotation of the motor 91 rotates the beveled gear 54 and cylinder 28 at a slow and constant speed.

A nozzle 109 (Fig. 1) is fixed to cylinder 28 by suitable means such as by welding its sides 110 to the bottom plate 85 of cylinder 28 and this nozzle 109 is in close proximity to the apertured plate 13 so as to provide an orifice 111 between the area under the piston 27 in cylinder 28 and the apertured plate 13. The orifice 111 provided by the nozzle 109 is just big enough to communicate with the open ends of two filter bags 25 and the cylinder 28 is continually rotatable 360° so as to selectively communicate the orifice 111 with the open ends of all the filter bags 25 in a repetitive sequence. Thus, only two bags at a time are in communication with cylinder 28 at any one time so that when the piston 27 is reciprocated to cause a puff, two bags only are puffed or reconditioned and all the other bags remain operative to filter particles from the prevailing dirty gas flow. It has been found that the volume under the piston 27 is advantageously greater than the volume of the filter bags 25 to be puffed. These novel arrangements together with the lifting mechanism 29, to be described hereinafter, ensure that continuous puffing takes place repeatedly in a manner so that all the filter elements are sufficiently puffed an equivalent number of times thereby to allow very high flow capacity through the filter bags 25.

As mentioned above, gear reducing drive 102 rotates cylinder 28 through one of its output shafts 101. The other output shaft 103 has attached thereto a crank 113 which rotates at a fixed rate of speed, proportional to the speed of output shaft 101. Crank 113 is engageable with a crank 115 through an extending pin 116. Crank 115 is suitably keyed to a cam shaft 117 which has a cam 119 attached thereto and shaft 117 is journalled in bearings 121. Thus as the driving crank 113 rotates it engages the driven crank 115 so that the cam 119 rotates until it contacts roller 123 mounted on a roller shaft 125 fixed between two lever arms 127 and these lever arms 127 pivot about fulcrum pin 129 journalled by collars 130. Collars 130 and bearings 121 are advantageously held on plate 56 by attaching them to a plate 120 which is held to plate 56 by bolts 131. The other ends of lever arms 127 are attached to the piston shaft 51 by a suitable linkage pin 132 and bushing 133 so that when cam 119 rotates it engages roller 123 and raises lever arms 127 together with shaft 51 and piston 27, the shaft 51 being movable upward and downward through bevel gear 54 and apertured plate 13 by means of bearings 53 and 55 and leakage along shaft 51 from chamber 19 is prevented by seal 57. The rotation of cam 119 (shown in detail in Fig. 4) and its engagement with roller 123 raises shaft 51 thereby compressing spring 66, and after reaching the peak of its lifting cycle the cam 119 allows the spring 66 to force the plunger shaft 51 down suddenly. After the peak of the lifting cycle of cam 119, cam shaft 117 will rotate arm 134 into engagement with arcuate bearing plate 135 which pivots on pin 138, is loaded by spring 136 and adjusted upward or downward by pin 137 thereby preventing the swinging of the cam shaft 117 after cam 119 disengages from roller 123. The piston 27 is raised slowly by the rotation of the cam 119, but the downward movement of the plunger 27 caused by the spring 66 is rapid so that when the piston 27 is forced downward is causes a reverse flow of gas in the two filter elements with which the orifice 111 of cylinder 28 is in communication. Since the rotation of cylinder 28 and the raising of plunger 27 are both actuated by the same gear reducer drive 102, the puffing caused by piston 27 is readily coordinated with the rotation of cylinder 28 so that the orifice 111 of cylinder 28 is held in direct communication with the open ends of one large and one small diameter filter bag 25 when the downward movement of the plunger 27 causes a puff to take place.

As mentioned above, advantageously the filter bags 25 are supported on their downstream positions by longitudinal rods 43 attached to circular hoops 44. It has been found that by using such supporting members, the dust accumulated on the outside of the bags is more readily removed by the puffing action described above due to the fact that the bags are free to flex and thereby break up the dust, if it is caked, on the upstream portions 39 of the bags 25. Adavntageously there are four rods 43 and seven hoops 44 per bag 25.

The inlet duct 17 is arranged at the top of chamber 15 so that the dirty gas entering inlet 17 tends to move in a downward direction in chamber 15. This is important because when the particles are removed from the upstream sides of the filter bags by puffing, the downward movement of the gas tends to transport the particles removed from the bags down into the bin or hopper 35.

Figure 6:
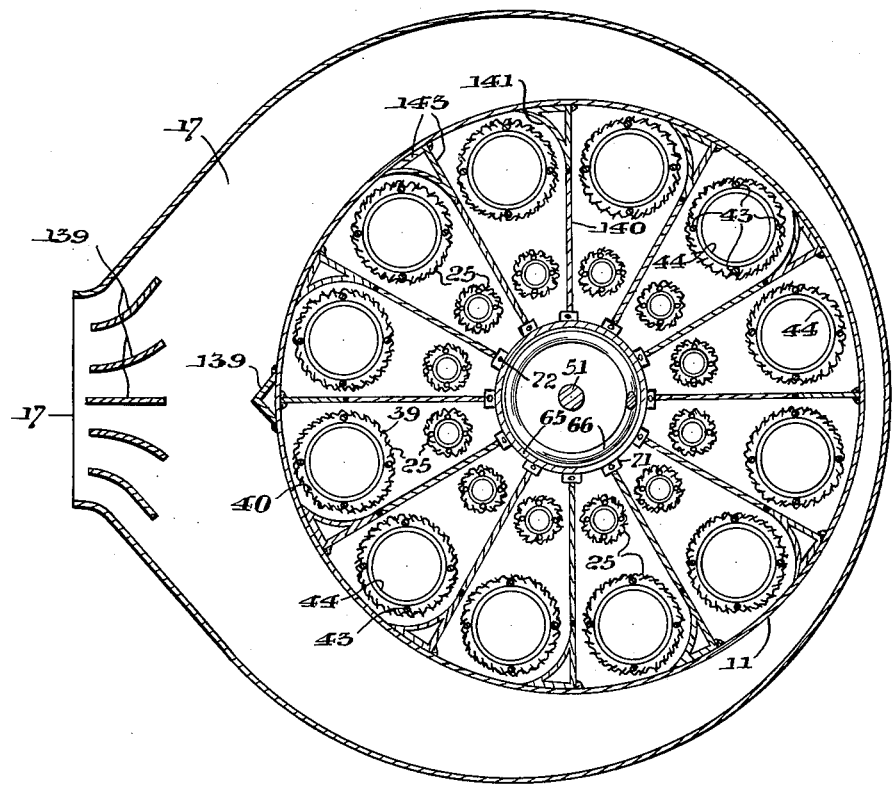
Fig. 6 is a sectional view of the baffle arrangements through the line 6—6 of Fig. 1.

Advantageously baffles 139 (Fig. 6) are curved and straight and are provided in the inlet duct 17 which bulges from the side of housing 11 and encircles the housing 11 to which it is attached by welding. Baffles 140 (Fig. 6) have curved portions 141 attached thereto and these baffles 140 and 141 are arranged between adjacent filter bags 25 in an annular array radiating from lugs 71 of tube 65 so as to substantially enclose two filter bags of different diameters. The curved portion 141 is attached to an L-shaped support 143. Advantageously the curved portions 141 and support 143 are attached to the sides of the housing 11 by welding. The baffles 140 are advantageously attached to the curved portions 141 at one end by suitable means such as by welding and baffle 140 forces lugs 71 of tube 65 at the other end as shown in Fig. 6 but other arrangements may be used by one skilled in the art for ease of assembly. Baffles 139 disperse the gas entering at inlet 17 evenly in inlet duct 17 and baffles 140 (with their curved potrions 141 disposed between the adjacent filter bags 25) prevent the re-entrainment of dust particles from one filter bag to the next adjacent filter bag of the same size after puffing. Also these baffles 140 operate in cooperation with the inlet baffles 139 by means of curved portions 141 so as to efficiently disperse the dirty gas from the inlet duct 17 over the entire filtering surfaces of the filter bags 25 whereupon the dirty gas flows through the filter bags 25 in such a manner as to deposit the solid material entrained therein on the outside or upstream surfaces 39 of the filter elements 25 and whereby clean gas flows from the downstream portions 40 of the filter elements into chamber 19 and thence through outlet duct 21.

During the filtering operation, cylinder 28 is rotated by the gear reducer drive 102 (Fig. 4) which drive is also operable to raise shaft 51 and piston 27, and the piston 27 is lowered suddenly by actuating mechanism 31 so that particles are puffed off the outside of only two bags 25 at a time so that the dust removed from the bags 25 falls into the hopper 35 at the bottom of housing 11. This puffing may be set at any suitable interval, for example, at nine puffs per minute. The force which suddenly lowers the piston 27 may be great and in order to cushion the unit from the shock caused by this sudden downward movement of the piston 27 a shock absorber 33 is provided. It is necessary to buffer the shock caused by the sudden downward movement of the piston 27 but the shock caused by the sudden downward motion of the piston 27 may not be eliminated altogether, however, because a certain amount of this shock may help remove particles deposited on the filter bags 25 when they are puffed.

In the operation of this novel filter for removing entrained particles from a gas thereby to clean the gas, a particle-laden prevailing gas stream is introduced into inlet 17 under pressure from a suitable source (not shown). This dirty gas is evenly distributed in the inlet duct 17 by the baffles 139. Cooperating with this even distribution of gas in inlet duct 17 are curved portions 141 attached to baffles 140 which cause the dirty gas to flow evenly to the upstream portions 39 of the filter elements 25 in chamber 15. The gas then flows through the filter elements 25 depositing the entrained solid material on the upstream portions 39 of the filter elements 25. Clean gas flows from the downstream portions 40 of the filter elements 25 through the open ends of the filter elements 25 communicating with apertures 37 of apertured plate 13 into chamber 19 and out of chamber 19 through outlet 21.

The particles deposited on the bags 25 tend to build up in thickness and reduce the flow of gas therethrough. The particles on the upstream portions 39 of the bags 25 are removed as cylinder 28 is continually rotated 360° so that the area in cylinder 28 under piston 27 communicates with the open ends of all the filter bags through orifice 111 in a sequence coordinated with the reciprocation of piston 27 at a predetermined repetitive sequence whereby two filter elements 25 are puffed at a time; for example, orifice 111 may communicate with two apertures 37, namely, A and B when a puff takes place. The cylinder 28 (Figs. 3 and 4) may then be rotated by motor 91 through gear reducer 102, chain 99, gear 97, shaft 94, gear $89_1$ and gear 54 thereby communicating the orifice 111 with two other apertures 37, namely, C and D when the next puff takes place. Subsequently the orifice 111 is communicated with other apertures 37 such as E and F when a puff takes place and so forth until all the bags 25 are puffed.

This sequence whereby the orifice 111 is communicated with certain filter bags 25 when a puff takes place is determined by the rates of rotation of gear 54 and cam 119, cam 119 together with actuating mechanism 31 causing shaft 51 to be lifted and then dropped suddenly, and the speed of rotation of cam 119 being proportional to the speed of gear 54 because both members are driven by a motor 91 through gear reducer 102. As shaft 103 rotates its crank 113 rotates and pin 114 causes crank 115 to rotate thereby rotating shaft 117 and cam 119 so that as cam 119 rotates it contacts roller 123 attached to lever arms 127. The lever arms 127 are movable around fulcrum pin 129 and are attached to shaft 51 so that the rotation of cam 119 contacts roller 123 whereby shaft 51 may be reciprocated. The reciprocation of shaft 51 may be described as comprising a lifting cycle when cam 119 is in contact with roller 123 whereby the shaft 51 is lifted, a lowering cycle after cam 119 disengages roller 123 whereby the spring 66 forces shaft 51 downward, and a resting cycle between the times the cam disengages roller 123 and the time cam 119 re-engages roller 123. Thus the piston 27 is raised slowly in cylinder 28 during the lifting cycle and air may freely flow into the area of cylinder 28 under piston 27 through orifice 111. During this lifting cycle the collar 59 is raised with shaft 51 so that spring 66 is compressed. Piston 27 has substantially the same diameter as the inside diameter of cylinder 28 so that when cam 119 allows shaft 51 to enter the lowering cycle spring 66 causes the shaft 51 to descend rapidly thereby sweeping the air under the piston 27 in cylinder 28 through orifice 111 and the open ends of two filter bags 25 thereby to reverse flow gas through the two filter elements 25. In this connection baffles 140 disposed between adjacent groups of filter bags 25 prevent the re-entrainment of particles from the two bags that are puffed on to the next adjacent filter bags of the same size, for example, when the bags 25 connected to apertures A—B are puffed, there is no re-entrainment on the bags 25 connected to apertures K—L and O—P. When the piston shaft 51 reaches the bottom of its stroke collar 59 hits ring 76 which, upon hitting plate 68 through gasket 78 causes a shock to the filter and thereby causes a shaking action to the bags 25 which helps remove dust particles deposited on the upstream sides 39 of the bags. Buffer mechanism 31 (Fig. 1) prevents the downward movement of shaft 51 from causing destructive shocks in the filter when the shaft 51 is lowered by an arrangement whereby collar 59 fits snuggly inside tube 65 thereby allowing collar 59 to act as a piston for forcing oil located at the bottom of chamber 69 into orifice 79, oil being filled in chamber 69 approximately at least to point T in tube 65. For example, when the shaft 51 is raised collar 59 is raised and this ensures that oil in orifice 79 is drained from orifice 79 into chamber 69 and thus when shaft 51 is lowered collar 59 forces oil from the bottom of chamber 69 into orifice 79 which movement of oil gives a buffer effect by absorbing some of the energy in the spring 66. In addition springs 73 located in recesses 74 and enclosed by ring 76 expand when collar 59 is raised until shoulder 77 of ring 76 hits the bottom of tube 65 and thus when collar 59 is lowered it contacts ring 76 thereby causing springs 73 to compress and the resistance offered thereby tends also to buffer the shock caused by the downward movement of shaft 51.

Another embodiment for supporting the bags 25 (Fig. 5) comprises the use of a conventional circular coil spring coil spring 143 in each of the bags 25 which are supported on the inside of the bags 25 so as to contact the downstream portions 40 thereof. The coils of these springs 143 are advantageously spaced 4 inches apart and it is believed that this spacing may be critical but may operate satisfactorily if it is within the limits of 2 inches to 5 inches. By using such springs 143 the bags 25 flex sufficiently during the puffing operation to break off caked material deposited on the upstream portions 39 of the bags 25 and also these springs 143 serve to adequately support the bags against collapse due to the prevailing pressure to which the bags are exposed.

This novel invention by providing a dust filter with a plurality of porous filter bags therein, which are supported on their inside by novel supporting means, a mechanism for reverse flowing gas through the filter bags to flex the bags which includes a mechanism for continuously reciprocating the piston and a buffer for cushioning the shock caused by the reciprocation of the piston as well as suitable baffles to convey the dirty gas evenly to the filter bags, provides a dust filter of high flow capacity and increased efficiencies.

Although the foregoing has illustrated and described the invention in detail it is to be expressly understood that the invention is not limited thereto. Various changes can be made in the design and arrangement of the parts without departing from the spirit and scope of the invention as will now be understood by those skilled in the art.

What is claimed is:

1. In a filter comprising, porous filter means having an up stream side and a down stream side means for conducting the particle laden gas stream under pressure to said up stream side, a piston chamber communicating with said filter means, and a piston mounted in said chamber for puffing air under pressure greater than and counter to the flow of the particle laden air stream through said filter, the improvement comprising; a housing depending from said piston chamber having a closed end remote from said chamber, a piston shaft connected to said piston and disposed within said piston chamber, a buffering means including an oil filled section and a resiliently mounted plate located in said casing adjacent said closed end for cushioning the shock of said piston when the latter is operative to puff air through said filter, and means connected to said piston shaft for periodically reciprocating said piston.

2. The invention as defined in claim 1 in which said oil filled section is provided with an orifice located so as to relieve the oil pressure when said buffering means is operative.

3. In a filter having a plurality of filter elements exposed to a prevailing gas flow through said elements and a reciprocatable piston in a rotatable cylinder for selectively counterflowing gas through said filter elements, a control mechanism comprising a drive means, first driven means connected to said drive means for rotating said cylinder and for selectively communicating the area in said cylinder under said piston with said filter elements in a first predetermined constant sequence, second driven means connected to said drive means having an eccentric cam and lever for raising said piston in a second predetermined constant sequence, a means coordinated with said first and second sequences for lowering said piston suddenly in a predetermined third constant sequence which is continually repetitive, and buffer means for said piston including an oil filled section having an orifice for throttling the flow of oil therethrough caused by the downward movement of said piston and having springs for resisting the downward movement of said piston.

4. In a filter having a plurality of filter elements exposed to a prevailing gas flow through said elements and a reciprocatable piston arranged in a rotatable cylinder for selectively counterflowing gas through said filter elements, a control mechanism comprising first driven means for communicating the large area in said cylinder under said piston with alternate filter elements, a cam shaft having an eccentric cam, a lever attached to said piston, second driven means operable with said first driven means and said lever for rotating said cam shaft to cause said cam to raise said piston in said cylinder, means operable with said first and second driven means to lower said piston suddenly at predetermined constant intervals so as to momentarily counterflow gas through said alternate filter elements in a continuously repetitive sequence, and means operable with said piston for throttling a liquid and compression springs arranged in said filter so as to cushion the shock caused by the sudden lowering of said piston.

5. In a filter having a plurality of filter elements exposed to a prevailing particle-laden gas flow from a gas inlet so as to deposit particles on the outside of said elements, a reciprocatable piston arrnaged in a rotatable cylinder for momentarily counterflowing gas through said elements to remove deposited particles from the outside of said elements, first baffles disposed in said gas inlet for directing said prevailing gas flow evenly in said inlet, second baffles disposed between said filter elements and including curved vanes attached to said second baffles for scooping air from said inlet equally to said filter elements and for preventing redepositing on second filter elements of particles removed from the outside of first filter elements by the counterflowing of gas through said first filter elements, a control mechanism for said filter comprising first driven means for communicating the area in said cylinder under said piston with said filter elements, a second driven means for raising said piston in said cylinder, means operable with said first and second means for suddenly lowering said piston at predetermined constant intervals to momentarily counterflow gas through said filter elements, and means operable with said piston for cushioning the shock caused by the sudden lowering of said piston.

References Cited in the file of this patent

UNITED STATES PATENTS

| | | |
|---|---|---|
| 2,047,908 | Newhouse et al. | July 14, 1936 |
| 2,594,417 | Gerber | Apr. 29, 1952 |
| 2,731,107 | Hersey | Jan. 17, 1956 |
| 2,765,047 | Hersey | Oct. 2, 1956 |

FOREIGN PATENTS

| | | |
|---|---|---|
| 895,816 | France | Apr. 11, 1944 |